E. FABER.

LEAD OR CRAYON HOLDER.

No. 11,285. Reissued Nov. 22, 1892.

Witnesses:
J. Stair
Chas. H. Smith

Inventor:
Eberhard Faber,
per Lemuel W. Serrell
Atty.

THE NORRIS PETERS CO., PHOTO-LITHO., WASHINGTON, D. C.

UNITED STATES PATENT OFFICE.

EBERHARD FABER, OF NEW BRIGHTON, NEW YORK.

LEAD OR CRAYON HOLDER.

SPECIFICATION forming part of Reissued Letters Patent No. 11,285, dated November 22, 1892.

Original No. 444,148, dated January 6, 1891. Application for reissue filed June 20, 1892. Serial No. 437,370.

*To all whom it may concern:*

Be it known that I, EBERHARD FABER, of New Brighton, in the county of Richmond and State of New York, have invented an Improvement in Lead or Crayon Holders, of which the following is a specification.

Before my invention clamping pencil-holders had been made with a split tube and either double or single inclined jaws at the ends, that were caused to clamp the lead or crayon by a surrounding tube, ring, or holder, a movement being given to one of the parts in relation to the other to act on the inclines and force the jaws upon the lead or crayon. In cases where the lead-holding tube has received an end movement for clamping or releasing the lead it has extended to the upper end of the external tube or holder and been acted upon by a cross-pin, ring, or similar device, or else by a pin or tongue passing through a slot in the exterior tube or holder.

My improvement is for simplifying and cheapening the lead or crayon holder; and it consists in a sliding lead-holding tube split longitudinally and having double-inclined clamping-jaws at the outer end and a handle with a tubular end, into which the lead-holder is received and within which it is allowed a limited end movement, the clamping-jaws projecting below the end of the handle, so as to be easily grasped by the thumb and finger for drawing the lead-holding tube outwardly to relieve the clamping action or forcing it inwardly to clamp the lead or crayon. Hence the parts are simple, small, and cheap and can be applied to a tubular handle, and they are efficient and not liable to get out of order.

Figure 2:
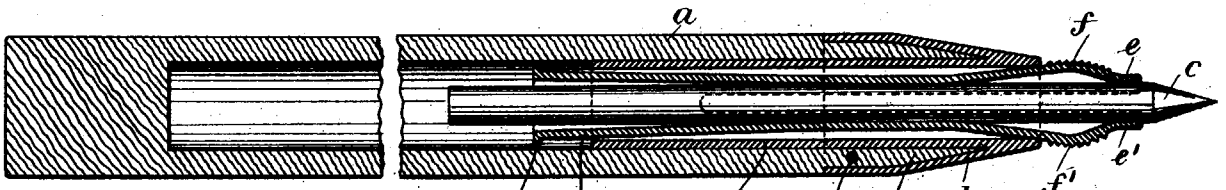
Figure 1:
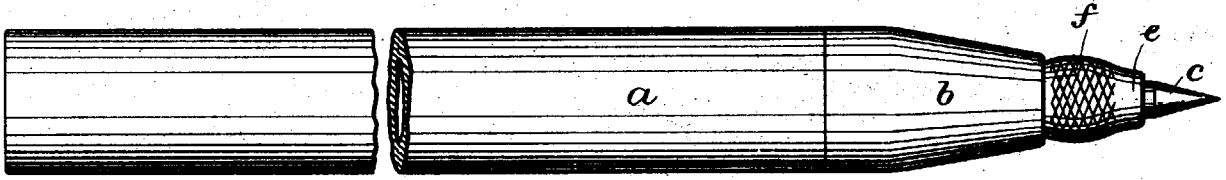

In the drawings, Figure 1 is an elevation, and Fig. 2 a longitudinal section, of the improved lead or crayon holder, the parts being of a magnified size and the handle shortened by the center part being shown as broken out.

The sheath or tubular handle $a$ is of any desired size and the lower end is shown as tapering, and within the tubular handle $a$ is the lead or crayon $c$ within the receiving-tube $d$, which latter is of a size to allow the lead or crayon to slide freely within it, and this tube $d$ is slotted longitudinally, as seen by the dotted lines, Fig. 2, and the outer and lower end thereof is made with the clamping-jaws $e$ $e'$, which have reverse inclined exterior surfaces, as seen in Fig. 2, and they are preferably roughened upon their exterior surfaces, as seen in Fig. 1, so as to be adapted to being grasped by the fingers in pressing the lead-holding tube inwardly and causing the inclines to act in pressing the jaws upon the lead to hold the same, or in drawing the lead-holding tube outwardly sufficiently to relieve the clamping action and allow the lead to be adjusted. The tube $b'$ within the handle $a$ is represented with the tapering metal cap $b$, forming an end to the handle $a$, and these parts may be secured by a pin $b^2$, and within this metal tube $b'$ the lead-receiving tube $d$ slides, and to prevent this tube $d$ being drawn out of the tube $b'$ a stop is used, which is represented as the turned-over end $d'$ of the lead-receiving tube $d$. When the pencil or crayon is in use, the pressure on the lead or crayon increases the clamping action.

I claim as my invention—

1. The combination, with the sheath or tubular handle having the tube $b'$, of the tubular lead or crayon holder having a limited end movement within the tube $b'$ and having clamping-jaws with reverse inclined exterior surfaces and projecting beyond the end of the tube $b'$, so as to be grasped and moved by the fingers in clamping or releasing the lead or crayon, substantially as set forth.

2. The combination, with the sheath and the tube $b'$ and tapering cap $b$, of the tubular lead or crayon holder $d$, having a turned-over end $d'$, forming a stop to prevent the holder being drawn out, and clamping-jaws with reverse inclined exterior surfaces and roughened, so as to be grasped in moving the holder endwise to clamp or release the lead or crayon, substantially as set forth.

Signed by me this 16th day of June, 1892.

EBERHARD FABER.

Witnesses:

GEO. T. PINCKNEY,

WILLIAM G. MOTT.